April 11, 1972 R. H. DORNBOS Re. 27,339

TURNBUCKLES

Original Filed March 29, 1967

INVENTOR.
Russell H. Dornbos

Austin A. Webb

ATTORNEY

United States Patent Office

Re. 27,339
Reissued Apr. 11, 1972

27,339
TURNBUCKLES

Russell H. Dornbos, Spring Lake, Mich., assignor to Gerwin Industries, Inc., Michigan City, Ind.

Original No. 3,442,000, dated May 6, 1969, Ser. No. 626,843, Mar. 29, 1967. Application for reissue May 25, 1970, Ser. No. 41,123
Int. Cl. B23p *13/00*
U.S. Cl. 29—175 10 Claims

Matter enclosed in heavy brackets [ ] appears in the original patent but forms no part of this reissue specification; matter printed in italics indicates the additions made by reissue.

ABSTRACT OF THE DISCLOSURE

Manufacturing steps of extruding tubular metal bar stock of greater width than thickness and having edges of reduced thickness, with an internal bore of rectangular cross section in the thicker portion of the tube; cutting the tube transversely into slugs of lesser width than the thickness of the tube, boring alined holes into the ends of the slugs through narrower ends formed from the reduced edges and into the ends of the oblong opening formed by the extrusion, and tapping the holes with oppositely pitched threads at opposite ends of the slugs.

Outline of the invention

A bar of tubular metal of uniform density and strength is formed by extrusion. The bar is wider than it is thick and has side edges of reduced thickness. The hollow interior of the tube is of rectangular cross section disposed in the thicker portion of the tube. The tube is cut transversely into slugs of lesser width than the thickness of the tube, and holes are drilled and tapped through the ends of the slugs into the ends of the openings formed by the interior of the tube, with the threads at the opposite ends of the slugs being oppositely pitched to receive the threaded ends of the eye-bolts of a turnbuckle. Desirably, the thickness of the tubular extrusion fits within one standard size of wrench, and the width of the slugs measured between the cuts from the tube fits within another standard wrench of smaller size than the wrench which fits the thickness of the tube.

The drawings, of which there is one sheet, illustrate a highly practical way of performing the steps of the manufacturing process.

Figure 1:
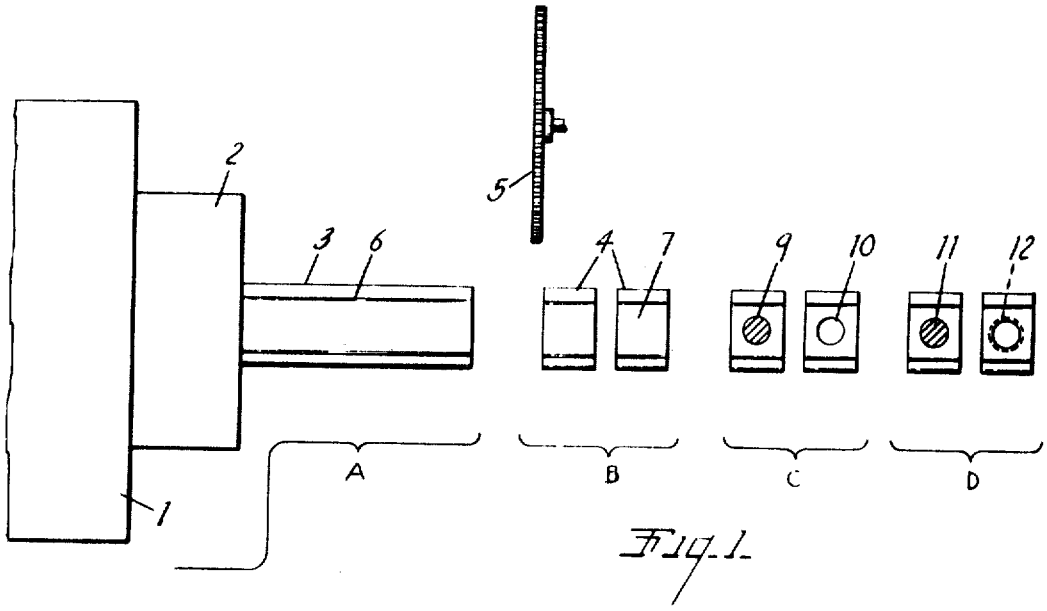
FIG. 1 is an elevational view, conventionally illustrating the steps of the method of manufacture.

The section A of FIG. 1 conventionally illustrates an extrusion press 1 having a forming die 2. The press is adapted to extrude metal, and the die is designed to shape the metal into tubular stock, as the metal is delivered in solidified bar form at 3 with the metal uniformly compacted by the pressure of the extrusion process. Such metal extruding machines are well known so the press and its operation are not described in greater detail. The extruded metal and the bar formed thereby may be aluminum or of other metals or alloys, capable of being extruded, as is desired.

Section B of FIG. 1 conventionally illustrates an operation of cutting separate slugs or bodies 4 of metal from the end of the bar 3, by means such as the saw 5. The tubular bar is of greater width than thickness, and length or width of the slugs measured between the cut sides thereof is narrower or thinner than the thickness of the tube.

The tubular extrusion has side edges 6 of lesser thickness than the mid-portion of the bar, and these thinner edges form narrower ends 7 on the slugs 4. The hollow interior of the tubular extrusion is formed in the thicker center of the bar. When the slugs 4 are cut from the bar, this forms an elongated central opening 8 in the slugs as appears in FIG. 2.

In section C of FIG. 1 there is illustrated a boring operation in which a bit 9 is run into the ends of the slugs, forming alined holes 10. Depending upon the amount and type of machinery available, the holes 10 may be formed successively in opposite ends of each slug, or simultaneously in opposite ends of each slug. The holes 10 may also be formed in the extruded bar before the slugs are separated by the saw 5. The use of multiple head drilling machines for forming multiple bores 10 in one or both sides of the bar 3 may also be feasible.

In section D of FIG. 1 there is conventionally illustrated a tapping operation in which a tap 11 is run into the bores 10 to form threads 12. As in the case of the bores 10, the taps 11 may be multiplied, and the operation may be performed on the bar stock 3 before the separation of the slugs. However, the tapping tools used on opposite ends of the slugs or sides of the bar are oppositely pitched to form oppositely, pitched threads 12A and 12B. In order to distinguish the right hand thread from the left hand thread, one side of the extrusion is formed with grooves on both sides that leave identifying notches 13 in the edges of one end of the slug.

Figure 2:
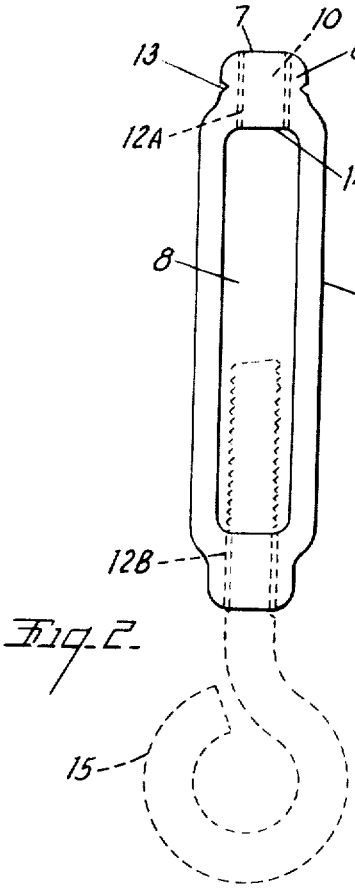
FIG. 2 is a side elevational view of the turnbuckle body formed by the method, with one eye-bolt shown in assembled position in dotted lines.
Figure 3:
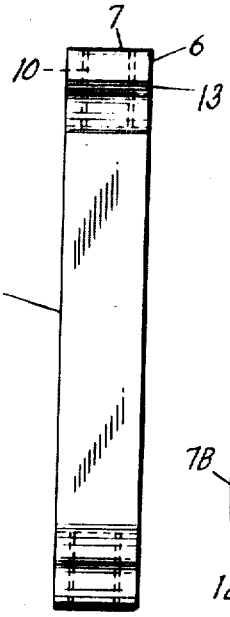
FIG. 3 is an edge elevational view of the body in FIG. 2.
Figure 4:
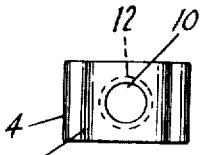
FIG. 4 is an end elevational view of the body in FIGS. 3 and 4.

In the slug or turnbuckle body 4 shown in FIG. 2, the inner opening 8 is generally rectangular with flat opposed ends 14. The usual eye-bolts are receivable into the threaded bores as is indicated by the dotted lines at 15. Desirably the thickness of the extrusion which determines the width of the slug 4 is sized to fit within one size of standard wrench, while the thickness of the slugs between their cut faces fits within a smaller size of standard wrench.

Figure 5:
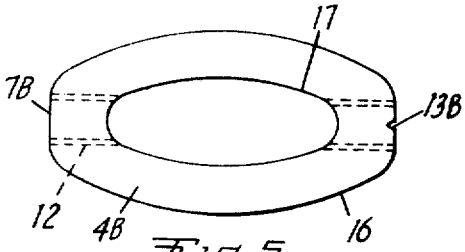
FIG. 5 is a side elevational view of a modified form of turnbuckle body formed from an extrusion of modified cross section.

The cross sectional shape of the extruded bar and the corresponding shape of the turnbuckle body is not limited to the first shape illustrated. FIG. 5 illustrates a modified body 4B with a generally elliptical outer contour 16 and an elliptical inner opening 17. Tapped holes 12 are formed through the somewhat flattened ends 7B and receive the eye-bolts as in the first form of the body. An identifying notch 13B is formed in one end of the body by a groove formed in the edge of the extruded bar from which the modified body is cut. The modified body has a certain advantage in that its elliptical shape provides a wide range of widths to which wrenches of different sizes may be applied.

What is claimed as new is:

1. The method of manufacturing bodies for turnbuckles which comprises the steps of extruding a tubular bar of metal having greater width than thickness and having an inner opening that is wider than it is thick, cutting the bar so extruded transversely of its length to form slugs with parallel sides and of lesser thickness between said sides than the thickness of said bar, boring alined holes through the ends of said slugs into the openings formed therethrough by inner opening in said bar, and tapping the bores with the threads formed at opposite ends of the slugs being oppositely pitched.

2. The method as defined in claim 1 in which said bar is formed with transversely opposite side portions that are thinner than the transverse center of the bar, and which form narrowed ends on said slugs.

3. The method as defined in claim 1 in which the side surfaces of said bar as extruded are flat and parallel and perpendicular to a longitudinal plane passed transversely through said bar to form flat ends on said slugs through which said bores are formed.

4. The method as defined in claim 1 in which said bar is extruded with a longitudinal groove in its surface adjacent one side edge thereof to form a distinguishing notch in one end of said slugs.

5. The method as defined in claim 1 in which the wider sides of said tube as extruded have central portions that are flat and parallel, the corresponding sides of the opening in said tube also being flat and parallel.

6. The method as defined in claim 1 in which the cross section of said tube along the plane of the cut off sides of said slugs is generally elliptical and thicker in the center.

*7. The method of manufacturing bodies for turnbuckles which comprises the steps of*

*extruding a tubular bar of metal having greater width than thickness and having an inner opening that is wider than it is thick,*

*said bar having the same cross section as the cross section of the turnbuckle bodies to be formed, and consisting of a series of integrally formed and connected bodies,*

*boring alined holes through the ends of said bodies into the openings formed by the interior of said tubular bar,*

*tapping the holes in said bodies with the threads at opposite ends of the bodies being oppositely pitched, and cutting said bar transversely of its length to separate said bodies.*

*8. The method as defined in claim 7 in which the steps of boring and tapping said holes are performed after the step of cutting the bar into separate bodies.*

*9. The method as defined in claim 7 in which the step of boring said holes is performed before the step of cutting said bar into separate bodies.*

*10. The method as defined in claim 9 in which the step of tapping said holes is also performed before the step of cutting said bar into separate bodies.*

References Cited

The following references, cited by the Examiner, are of record in the patented file of this patent or the original patent.

UNITED STATES PATENTS

| | | | |
|---|---|---|---|
| 1,860,605 | 5/1932 | Baldwin. | |
| 2,239,203 | 4/1941 | Rendleman | 29—417 X |
| 2,392,175 | 1/1946 | Norton | 72—256 X |
| 3,209,432 | 10/1965 | Cape | 29—417 X |
| 3,399,560 | 9/1968 | Connolly et al. | 72—256 X |
| 3,489,443 | 1/1970 | Larson | 287—60 |
| 3,065,006 | 11/1962 | Sherburne | 287—60 |

JOHN F. CAMPBELL, Primary Examiner

D. C. REILEY, Assistant Examiner

U.S. Cl. X.R.

29—417, Dig. 15, Dig. 47; 72—254, 377; 287—60